(12) United States Patent
Sirdey et al.

(10) Patent No.: US 11,949,770 B2
(45) Date of Patent: Apr. 2, 2024

(54) METHOD AND SYSTEM FOR CONFIDENTIAL CLASSIFICATION OF DATA

(71) Applicant: COMMISSARIAT A L'ENERGIE ATOMIQUE ET AUX ENERGIES ALTERNATIVES, Paris (FR)

(72) Inventors: Renaud Sirdey, Cernay-la-Ville (FR); Sergiu Carpov, Massy (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 376 days.

(21) Appl. No.: 17/605,390

(22) PCT Filed: Apr. 21, 2020

(86) PCT No.: PCT/FR2020/000144
§ 371 (c)(1),
(2) Date: Oct. 21, 2021

(87) PCT Pub. No.: WO2020/217005
PCT Pub. Date: Oct. 29, 2020

(65) Prior Publication Data
US 2022/0224508 A1    Jul. 14, 2022

(30) Foreign Application Priority Data
Apr. 23, 2019   (FR) ...................................... 1904280

(51) Int. Cl.
*H04L 29/06*     (2006.01)
*G06F 21/62*     (2013.01)
(Continued)

(52) U.S. Cl.
CPC .......... *H04L 9/008* (2013.01); *G06F 21/6254* (2013.01); *G06N 3/088* (2013.01); *H04L 2209/42* (2013.01)

(58) Field of Classification Search
None
See application file for complete search history.

(56) References Cited

U.S. PATENT DOCUMENTS 9,009,089 B1 *  4/2015  El Defrawy ...... G06F 16/90344
                                                706/18
10,181,049 B1 *  1/2019  El Defrawy ............ H04L 9/085
(Continued)

FOREIGN PATENT DOCUMENTS

WO    WO 2018/104686 A1    6/2018

OTHER PUBLICATIONS

Gaid, Michael Lahzi et al. Secure Translation Using Fully Homomorphic Encryption and Sequence-to-Sequence Neural Networks. 2018 28th International Conference on Computer Theory and Applications (ICCTA). https://ieeexplore.ieee.org/stamp/stamp.jsp?tp=&arnumber=9499157 (Year: 2018).*

(Continued)

*Primary Examiner* — Jeremiah L Avery
(74) *Attorney, Agent, or Firm* — Oblon, McClelland, Maier & Neustadt, L.L.P.

(57) ABSTRACT

A computer platform includes an artificial neural network (ANN) as well as a classifier. The ANN is configured, after a learning phase, to transform an input data vector into a discriminating feature vector having a smaller dimension. A user then generates, from a plurality of reference data vectors, the same plurality of reference feature vectors, which are encrypted in an encryption module using the public key of a homomorphic cryptosystem and stored in a reference database of the platform. When the user requests the classification of an input data vector, the ANN, or a copy thereof, provides the classifier with a corresponding discriminating feature vector (y). Distances from the vector to the different reference feature vectors are calculated in the homomorphic domain and the index of the reference feature (Continued)

vector closest to y, i.e. the identifier $i_0$ of the class to which it belongs, is returned to the user.

13 Claims, 4 Drawing Sheets

(51) Int. Cl.
*G06N 3/088* (2023.01)
*H04L 9/00* (2022.01)

(56) References Cited

U.S. PATENT DOCUMENTS

| | | | |
|---|---|---|---|
| 10,289,816 B1* | 5/2019 | Malassenet | G06F 21/14 |
| 10,491,373 B2* | 11/2019 | Jain | H04L 9/008 |
| 2015/0089243 A1* | 3/2015 | Veugen | H04L 9/008 713/190 |
| 2017/0243028 A1* | 8/2017 | LaFever | G06F 21/6254 |
| 2017/0372201 A1* | 12/2017 | Gupta | G06N 20/00 |
| 2018/0139054 A1* | 5/2018 | Chu | H04L 9/008 |
| 2018/0336463 A1 | 11/2018 | Bloom | |
| 2018/0349577 A1* | 12/2018 | Goldwasser | H04L 9/3073 |
| 2019/0258953 A1* | 8/2019 | Lang | G06N 3/08 |
| 2019/0296910 A1* | 9/2019 | Cheung | H04L 9/008 |
| 2019/0303579 A1* | 10/2019 | Reddy | H04L 9/3239 |
| 2019/0303623 A1* | 10/2019 | Reddy | G06F 8/71 |
| 2019/0305957 A1* | 10/2019 | Reddy | G06F 8/60 |
| 2019/0306173 A1* | 10/2019 | Reddy | H04L 63/0281 |
| 2019/0334708 A1 | 10/2019 | Carpov et al. | |
| 2019/0361917 A1* | 11/2019 | Tran | H04W 12/108 |
| 2023/0403132 A1* | 12/2023 | Vemury | H04L 9/3231 |

OTHER PUBLICATIONS

Vladuta, Valentin-Alexandru et al. A Proposed Solution for Analyzing the Behavior of a WSN using a Secured Neural Network Approach. 2018 International Symposium on Electronics and Telecommunications (ISETC). https://ieeexplore.ieee.org/stamp/stamp.jsp?tp=&arnumber=8583859 (Year: 2018).*

Li, Xiaodong et al. A Secure and Efficient Face-Recognition Scheme Based on Deep Neural Network and Homomorphic Encryption . 2018 International Conference on Virtual Reality and Visualization (ICVRV). https://ieeexplore.ieee.org/stamp/stamp.jsp?tp=&arnumber=8711086 (Year: 2018).*

Navghare, N.D.; Kulkarni, Dr. D.B. Data Privacy and Prediction Using Neural Network and Homomorphic Encryption. 2018 Second International Conference on Intelligent Computing and Control Systems (ICICCS). https://ieeexplore.ieee.org/stamp/stamp.jsp?tp=&arnumber=8662835 (Year: 2018).*

U.S. Appl. No. 16/467,851, filed Jun. 7, 2019, US 2019/0334708 A1, Sergiu Carpov et al.

U.S. Appl. No. 16/899,056, filed Jun. 11, 2020, US 2020/0394518 A1, Renaud Sirdey et al.

U.S. Appl. No. 17/259,092, filed Jan. 8, 2021, US 2021/0318869 A1, Joel Cathebras et al.

U.S. Appl. No. 17/259,065, filed Jan. 8, 2021, Joel Cathebras et al.

U.S. Appl. No. 17/276,725, filed Mar. 16, 2021, Aymen Boudguiga et al.

U.S. Appl. No. 17/282,601, filed Apr. 2, 2021, Renaud Sirdey et al.

International Search Report dated Jul. 22, 2020 in PCT/FR2020/000144 filed on Apr. 21, 2020 (citing references AA-AB, AO, and AT therein, 2 pages).

Preliminary French Search Report dated Feb. 12, 2020 in French Application No. 1904280 filed on Apr. 23, 2019 (citing references AA, AO, and AT therein, 1 page).

Bost et al., "Machine Learning Classification over Encrypted Data", IACR, International Association for Cryptologic Research, Jan. 12, 2015, vol. 20150112:190551, XP061017629, pp. 1-34.

Schroff et al., "FaceNet: A Unified Embedding for Face Recognition and Clustering", Proc. of IEEE CVPR, 2015, pp. 815-823, 10 total pages.

Bourse et al., "Fast Homomorphic Evaluation of Deep Discretized Neural Networks", Crypto, 2018, pp. 483-512.

Cheon et al., "Batch Fully Homomorphic Encryption over the Integers", Advances in Cryptology—Eurocrypt 2013, Lecture Notes in Computer Science, vol. 7881, Springer, Berlin, Heidelberg, 2013, pp. 315-335, 21 total pages.

Garay et al., "Practical and Secure Solutions for Integer Comparison", In Public Key Cryptography—PKC '07, vol. 4550 of Lecture Notes in Computer Science, Springer-Verlag, 2007, pp. 330-342, 13 total pages.

Brakerski et al., "Fully Homomorphic Encryption without Bootstrapping", ITCS, Cryptology ePrint Archive, Report 2011/27, 2012, 27 total pages.

* cited by examiner

METHOD AND SYSTEM FOR CONFIDENTIAL CLASSIFICATION OF DATA

TECHNICAL FIELD

The present invention relates to the field of artificial intelligence and more particularly to the field of deep learning by artificial neural network. It applies to the field of confidential data classification, in particular to that of facial recognition and that of speaker recognition.

STATE OF THE ART

Machine learning as a service (MLAS) is currently in full development. Generally speaking, in such a context, an artificial intelligence program hosted by a platform is trained on a corpus of data (in a supervised or unsupervised manner) during a learning phase. In an operational phase, a user can then provide data to the computing platform for classification or prediction purposes.

An example of a data classification service accessible via the cloud is the FaceNet facial recognition system. This accepts pixels of a photo as inputs and outputs either the identifier of a known face, or a probability vector indicating, for each face in a set of known faces, the probability that the input photo corresponds to that face. The FaceNet system uses a particularly complex deep convolutional neural network, the learning of which requires considerable expertise and computation time.

A description of the FaceNet facial recognition system can be found in the article by F. Schroff et al. entitled "FaceNet a unified embedding for face recognition and clustering" published in Proc. of IEEE CVPR, pp. 815-823, 2015.

In its operational phase, the FaceNet system may be required to recognise faces that were not present in the learning database. For obvious reasons of maintainability of the system, it is not possible to make the system perform a complete new learning when one or more new faces have to be recognised by the system. In order to remedy this difficulty, the FaceNet system comprises two cascaded modules: a first generic face photo analysis module, independent of the faces to be recognised, and a second classification module, specific to the faces to be recognised, which is much simpler than the first one and adapted to recognise a face on the basis of the analysis results provided by the first module. The analysis module consists of a deep neural network the learning of which is performed on a large human face database. It reduces the dimensionality of the input vector by projecting it onto a lower dimensional space (embedding), formed by face characteristics, and on which a similarity metric is defined. The second module performs the actual classification of the face to be recognised on the basis of a nearest neighbour or k-nearest neighbour algorithm using this metric. The identifier of the class in which the face photo is classified allows the user to recognise the face.

However, the FaceNet system does not guarantee confidentiality of the faces searched by the users nor the confidentiality of the search result.

Various solutions have been provided in the state of the art to ensure this confidentiality. For example, a user can resort to techniques of noise generation in the reference data that he/she transmits to the platform. However, this noise generation can lead to a degradation in facial recognition performance.

Even when the input data are not confidential, it is often the case that the result of the classification has to remain confidential, and even the set of classes used for this classification has itself to remain confidential.

In the article by F. Bourse et al. entitled "Fast homomorphic evaluation of deep discretized neural networks" published in CRYPTO (3) 2018, pp. 483-512, a deep neural network confidential evaluation system based on homomorphic encryption has been provided. The data are then provided to the classifier in an encrypted manner and the classifier performs the classification in the homomorphic domain. The classification result is obtained in the homomorphic domain. However, such a neural network is computationally complex. It is also irrelevant when it is simply a matter of classifying non-confidential data.

The object of the present invention is therefore to provide a method for confidentially classifying non-confidential data into a confidential set of classes.

DISCLOSURE OF THE INVENTION

The present invention is defined by a confidential data classification platform comprising an artificial neural network cascaded with a classifier, the artificial neural network being adapted to be trained during a learning phase on data vectors of a learning database and to transform, in an operational phase, input data vectors into discriminative characteristic vectors, said discriminative characteristic vectors being provided to the classifier and having a size smaller than that of the data vectors, said classification platform being original in that:

it comprises a reference base in which there are stored, during an initialisation phase of the classifier, reference characteristic vectors, obtained by transforming, by means of the artificial neural network or a copy thereof, reference data vectors, the reference characteristic vectors being stored in an encrypted form by a public key of a homomorphic cryptosystem of said user; and that after this initialisation phase, when the user requests the classification of an input data vector (x) from the classification platform, the classifier evaluates a classification function in the homomorphic domain, from the discriminative characteristic vector (y) provided by the artificial neural network or said copy thereof, and from the reference characteristic vectors stored in encrypted form in the reference base $(Enc(y_i^{ref}, HE.pk), i=1, \ldots, N)$, and transmits the result of said evaluation to the user.

According to an exemplary embodiment, the artificial neural network is an auto-encoder.

The homomorphic system may be additive. Alternatively, the homomorphic system may be a SHE or FHE system.

The user can then download a copy of the artificial neural network from the platform at the end of the learning phase. Said copy of the neural network is then configured to provide, during the initialisation phase, the reference characteristic vectors from the reference data vectors, the user having a module for homomorphic encryption by said public key, configured to homomorphically encrypt said reference characteristic vectors and transmit them to the platform where they are stored in the reference base.

Alternatively, the platform may further comprise a second artificial neural network configured to perform in the homomorphic domain a transformation operation equivalent to that performed by the artificial neural network in the cleartext domain, the user having a module for homomorphic encryption by said public key configured to encrypt said reference data vectors and transmit them to the platform where they are transformed by the second neural network into encrypted reference characteristic vectors in the homomorphic domain prior to being stored in the reference base.

In any case, the classifier can advantageously be configured to compute in the homomorphic domain, the scalar product of the discriminative characteristic vector, y, with the reference characteristic vectors, from the cleartext components ($y_1, \ldots, y_M$) of the discriminative characteristic vector, and the encrypted components of the reference characteristic vectors, by means of $$Enc\left(\sum_{i=1}^{M} y_{i,m}^{ref} y_m; HE.pk\right) = \left(\bigoplus_{m=1,\ldots,M} \left(Enc(y_{i,m}^{ref}, HE.pk) \otimes y_m\right)\right)$$

where $\oplus$ is the internal addition operation in the homomorphic domain and $\otimes$ is the external multiplication operation between an element of the homomorphic domain and a cleartext.

Said scalar product can then be computed by means of batch processing, by clustering the different components of each reference characteristic vector into a first composite cleartext message, said first composite cleartext message then being homomorphically encrypted, to obtain a first composite encrypted message, and by clustering the different components of the discriminative characteristic vector into a second composite cleartext message, said batch processing comprising an external multiplication of the first composite encrypted message with the second composite cleartext message The user can also provide the classifier with the public key HE.pk of his/her homomorphic cryptosystem and that the classifier is further configured to compute the ciphertext of the norm of the discriminative characteristic vector, Enc ($\|y\|^2$,HE.pk).

Preferably, the classifier is further configured to compute, in the homomorphic domain, the Euclidean distances between the discriminative characteristic vector (y) and the reference characteristic vectors ($y_i^{ref}$, i=1, ..., N), from the encrypted norm of the discriminative characteristic vector, the encrypted norms of the reference characteristic vectors, and the respective scalar products between the discriminative characteristic vector and the reference characteristic vectors.

According to a first alternative, the classifier compares said Euclidean distances in the homomorphic domain and returns the index of the reference data vector corresponding to the lowest Euclidean distance to the user.

In a second alternative, the classifier returns to the user said Euclidean distances obtained in the homomorphic domain and the user deduces therefrom, by means of the private key of his/her homomorphic cryptosystem, respective probabilities that the input data vector corresponds to the reference data vectors.

The invention further relates to a method for confidentially classifying data by means of an artificial neural network cascaded with a classifier, wherein the artificial neural network is trained during a learning phase on data vectors of a learning base and the artificial neural network or a copy thereof transforms, in an operational phase, input data vectors into discriminative characteristic vectors, said discriminative characteristic vectors being provided to the classifier and having a size smaller than that of the data vectors, said method comprising:

during an initialisation phase of the classifier, storing in a reference base reference characteristic vectors, obtained by transforming, by means of the artificial neural network or said copy, reference data vectors, the reference characteristic vectors being stored in encrypted form by a public key of a homomorphic cryptosystem of said user; and after this initialisation phase, when the user requests the classification of an input data vector (x) from the classification platform, a classification function (f) is evaluated by the classifier in the homomorphic domain, from the discriminative characteristic vector (y) provided by the artificial neural network and the reference vectors stored in encrypted form in the reference base (Enc($y_i^{ref}$,HE.pk), i=1, ..., N), the result of said evaluation being transmitted to the user.

BRIEF DESCRIPTION OF THE DRAWINGS

Further characteristics and advantages of the invention will become apparent from a preferred embodiment of the invention, described with reference to the accompanying figures, among which.

DETAILED DISCLOSURE OF PARTICULAR EMBODIMENTS

In the following, a confidential data classification system will be considered. Without loss of generality, a facial recognition application operating on image data will be referred to. However, the skilled person will understand that this system can be applied to the confidential classification of other data types such as speech data for speaker recognition or even traffic measurements in a computer network for recognition of a type of cyber attack or anomaly.

Figure 1:
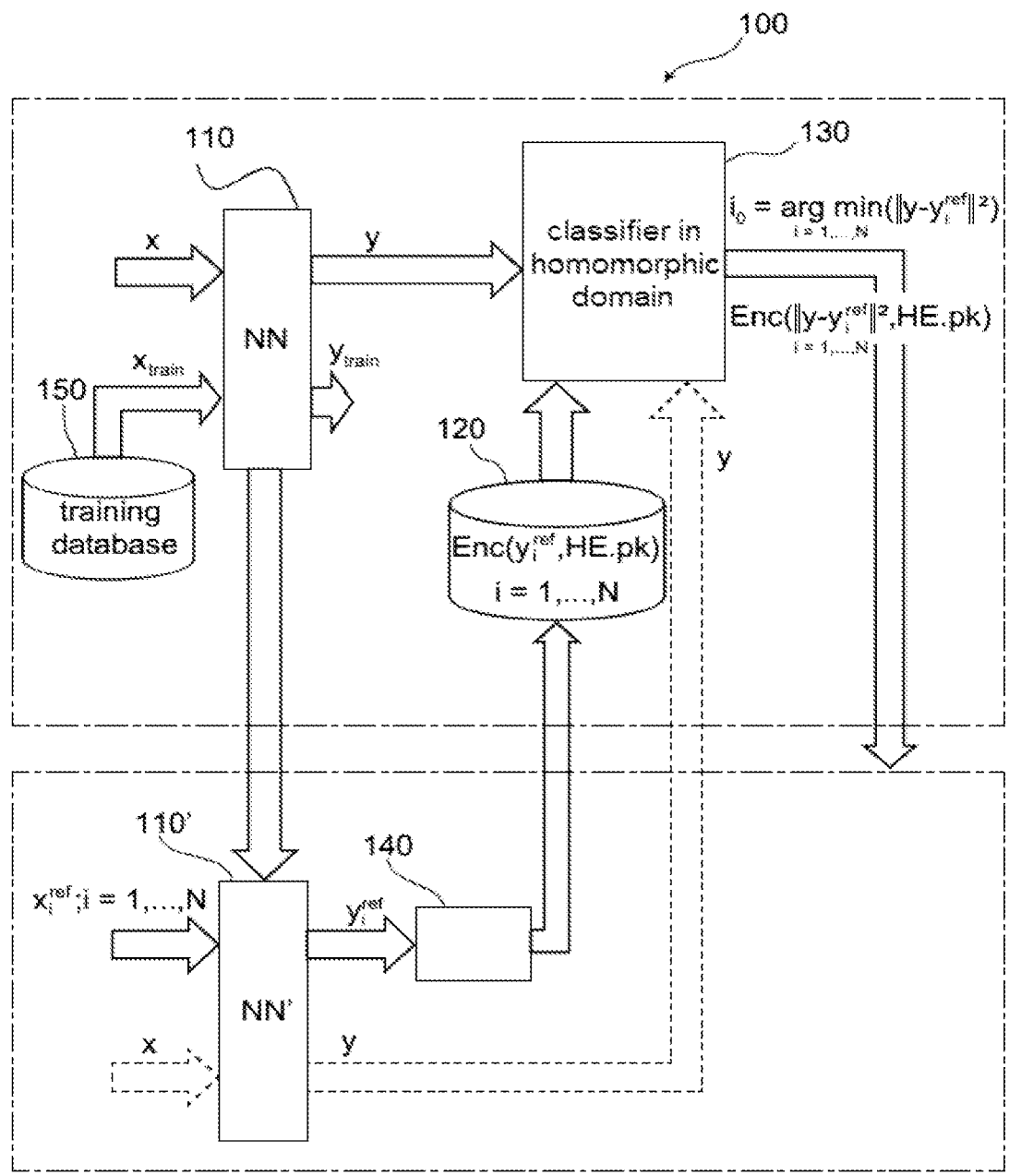
FIG. 1 schematically represents a confidential data classification system according to a first embodiment of the invention.

FIG. 1 schematically represents a confidential data classification system according to a first embodiment of the invention.

The confidential classification system, 100, also referred to as a confidential classification platform, first comprises an artificial neural network, 110, for learning, in a learning phase, discriminative characteristics from input data.

The input data may, where appropriate, have been pre-processed in a pre-processing module (not represented) before being provided to the artificial neural network. Examples of such pre-processing are a spatial or temporal Fourier transform as appropriate, a wavelet transform, a decomposition into an ad hoc orthogonal basis etc.

In any case, it will be assumed that the input data, whether raw data or pre-processed data, form a vector x in a space of dimension n, $x \in \square^n$. For example, in the case of image data, n may be a number of pixels or a number of spectral components.

The artificial neural network is adapted to provide a compressed representation of the input data in the form of discriminative characteristics, $y \in \square^m$, belonging to a space of reduced dimension m<n. The artificial neural network may especially be an auto-encoder comprising one or more hidden layers. This auto-encoder is trained in an unsupervised manner on a learning database, 150, herein an image database in the case of a facial recognition system. In the case of an image database, the artificial neural network may be a convolutional neural network.

The compression (or projection) function $f$ of the input data on the space of discriminative characteristics is such that if two input data vectors $x_1, x_2$ are close in the sense of a certain proximity relation in $\square^n$, the corresponding discriminative characteristic vectors $f(x_1), f(x_2)$ are also close in the sense of a norm in $\square^m$. In other words, if two images in the learning database 150 are similar, their compressed representations in the characteristic space will be "close" in the sense of a certain metric from a norm of $\square^m$.

Once the artificial neural network has been trained on the vectors $x_{train}$ of the learning database, in other words once it is initialised, the network is defined by a synaptic weight matrix (for example Python numpy file).

The user imports the synaptic weight matrix from the platform and builds a local neural network, 110', with the same synaptic weights as the one trained on the platform.

According to a first embodiment, the user then provides reference data to the local neural network. These reference data are data that will later have to be recognised. For example, the reference data can be images of individuals that will later have to be identified. It is important to note that these reference data are generally not present in the learning database. The reference data vectors will be noted in the following, $x_1^{ref}, \ldots, x_N^{ref}$.

The user thus obtains, output from the local neural network, discriminative characteristic vectors corresponding to these reference data vectors, $y_1^{ref} = f(x_1^{ref}), \ldots, y_N^{ref} = f(x_N^{ref})$. These vectors will be referred to as reference characteristic vectors in the following.

Now it is assumed that the user wants to classify an unknown image represented by an input data vector, x. This vector is evaluated by the local neural network 110', which provides a discriminative characteristic vector $y = f(x)$. Distances between the vector y thus obtained and the reference characteristic vectors, $y_i^{ref}$, $i=1, \ldots, N$ make it possible to classify the input data vector, x.

According to a first alternative, the classification can be performed by searching for the nearest neighbour, that is the reference characteristic vector with the smallest distance to the discriminative characteristic vector y:

$$i_0 = \underset{i=1,\ldots,N}{\operatorname{argmin}}\left(\left\|y - y_i^{ref}\right\|^2\right) = F(y) \quad (1)$$

In other words, the reference data vector $x_{i_0}^{ref}$ is recognised in the input data vector x.

Alternatively, the classifier can compute probabilities that each reference data vector is recognised in the input data vector $$p_i = \frac{\left\|y - y_i^{ref}\right\|}{\sum_{k=1}^{N}\left\|y - y_k^{ref}\right\|} \quad (2)$$

According to a second alternative, several reference data vectors $x_{i,1}^{ref}, \ldots, x_{i,M}^{ref}$ can be associated with the same identifier i. This will be the case especially when M different images of the face of a same individual are evaluated by the artificial neural network and the M corresponding reference characteristic vectors are available. A k-nearest neighbour type classification can then be performed to determine the identifier.

The purpose of the invention, namely confidential classification over a confidential set of classes, is achieved in that the classifier 130 of the platform operates in the homomorphic domain. More precisely, the discriminative characteristic vectors are encrypted using a homomorphic encryption and the search for the nearest neighbour is performed in the homomorphic domain.

It is assumed that the user has a homomorphic cryptosystem, comprised of a private key, HE.sk, and a public key, HE.pk.

The reference characteristic vectors $y_i^{ref}$, $i=1, \ldots, N$, obtained by means of the local neural network, are encrypted by the user using his/her public key, and then transmitted to the platform 100, which stores them in the reference base, 120. The reference characteristic vectors thus encrypted are noted $\text{Enc}(y_i^{ref}, \text{HE.pk})$. More precisely, $\text{Enc}(y_i^{ref}, \text{HE.pk}) = (\text{Enc}(y_{i,1}^{ref}, \text{HE.pk}), \ldots, \text{Enc}(y_{i,1}^{ref}, \text{HE.pk}))$ is the vector whose components are the ciphertexts of the components of $y_i^{ref}$. In the same way, the user encrypts the norms of these vectors using his/her public key, $\text{Enc}(\|y_i^{ref}\|^2, \text{HE.pk})$, $i=1, \ldots, N$ and transmits them to the platform which stores them in relation to the encrypted reference characteristic vectors, $\text{Enc}(y_i^{ref}, \text{HE.pk})$, $i=1, \ldots, N$.

If the reference base is to be subsequently completed by the user, for example if a new face is to be added to those to be identified, the image of this face is provided to the local neural network 110'. The user encrypts the reference characteristic vector obtained, as well as its norm, by means of his/her public key HE.pk as previously explained. The user transmits the encrypted vector and norm to the platform, which stores them in the reference base.

According to one advantageous embodiment, the homomorphic cryptosystem is simply of the additive type, that is it satisfies the following relationships:

$$\text{Enc}(a, HE.pk) \oplus \text{Enc}(b, HE.pk) = \text{Enc}(a+b, HE.pk) \quad (3\text{-}1)$$

and $$\text{Enc}(a, HE.pk) \otimes k = \text{Enc}(ka, HE.pk) \quad (3\text{-}2)$$

where $\oplus$ is an addition operation between ciphertexts in the homomorphic domain and $\otimes$ is an external multiplication operation between a ciphertext and a clear.

It is considered here the scenario where a user wishes to classify (or identify) an input data vector x, for example the image of an individual.

The input data vector x is provided directly to the platform. The input data can be, for example, from a video stream directly transmitted to the platform without passing through the user. In this case, the neural network 110 performs the compression $y = f(x)$, and then provides the vector y to the classifier 130.

Alternatively (a variant represented by the dotted arrows in FIG. 1), the user has access to the cleartext input data vector and provides it to the local neural network 110'. The latter then transforms it into a discriminative characteristic vector, also in cleartext, $y = f(x)$ and then transmits the vector y to the classifier 130.

In any case, the classifier can compute in the homomorphic domain, by means of operations (3-1) and (3-2), the Euclidean distances between the (cleartext) vector y and the (encrypted) reference characteristic vectors $y_i^{ref}$:

$$Enc\left(\|y - y_i^{ref}\|^2, HE.pk\right) = Enc(\|y\|^2, HE.pk) \oplus \qquad (4)$$

$$Enc\left(\|y_i^{ref}\|^2, HE.pk\right) \oplus \left(\bigoplus_{m=1,\ldots,M} \left(Enc(y_{i,m}^{ref}, HE.pk) \otimes y_m\right)\right) \otimes (-2)$$

where $y=(y_1, \ldots, y_M)$ and $y_i^{ref}(y_{i,1}^{ref}, \ldots, y_{i,M}^{ref})$.

The first term is the homomorphically encrypted norm of the discriminative characteristic vector. This encrypted norm can be transmitted by the user. Alternatively, it can be easily computed by the classifier if it has the cleartext vector y and the public key HE.pk (or even the encrypted components $Enc(y_m, HE.pk)$, the encrypted norm being then obtained by $$\bigoplus_{m=1,\ldots,M} (Enc(y_m, HE.pk) \otimes y_m).$$

The second term is the homomorphically encrypted norm of the reference characteristic vector of index i, $Enc(\|y_i^{ref}\|^2, HE.pk)$: this term is read from the reference base where it is stored in relation to the ciphertext of the reference characteristic vector i, $Enc(y_i^{ref}, HE.pk)$.

The third term is computed by the classifier in the homomorphic domain after retrieving from the reference base the encrypted components $Enc(y_{i,m}^{ref}, HE.pk)$ stored in relation to the ciphertext of the reference characteristic vector of index i, $Enc(y_i^{ref}, HE.pk)$. It will be understood that the part in brackets of the third term is none other than the ciphertext of the scalar product $$Enc\left(\sum_{i=1}^{M} y_{i,m}^{ref} y_m; HE.pk\right).$$

Finally, the sum of the three terms is obtained by the classifier in the homomorphic domain.

The comparison of distances can be performed in the homomorphic domain by means of Boolean circuits for the operator ">" (greater than) on binary representations of encrypted data, as described in the article by J. Garay et al. entitled "Practical and secure solutions for integer comparison", published in T. Okamoto and X. Wang editors, Public Key Cryptography—PKC 2007, volume 4450 of Lecture Notes in Computer Science, pages 330-342. Springer Berlin, Heidelberg, 2007.

Finally, the index $i_0$ of the reference characteristic vector with the minimum distance to the vector y, $$i_0 = \underset{i=1,\ldots,N}{\operatorname{argmin}}\left(\|y - y_i^{ref}\|^2\right),$$

is transmitted to the user. Since the platform does not have access to the cleartext reference characteristic vectors, the result of the classification remains confidential to the platform.

According to one alternative, the classifier can transmit the Euclidean distances in encrypted form to the user. The user then decrypts the distance values with his/her private key HE.sk and can either search for the index of the vector with the smallest distance to the vector y (cf. expression (1)) or estimate the probabilities that the vector y falls into one of N classes of the classifier (cf. expression (2)).

So far it has been assumed that classification was based on the search for the nearest neighbour. However, other classification functions F can be contemplated, for example a classification function in the form of a linear function or a polynomial function of the data to be classified. The classification function associates a class with each input data vector. This class can be defined by a representative, for example a reference data vector or, equivalently, the reference characteristic vector obtained by transforming the previous one by means of the artificial neural network.

By way of example of a linear function, mention can be made of a hyperplane classifier and by way of example of a polynomial (quadratic) classification, mention can be made of a Gaussian classifier. Preferably, an additive homomorphic cryptosystem in the previous sense will no longer be used, but a somewhat homomorphic cryptosystem (SHE) or even a fully homomorphic cryptosystem (FHE).

Advantageously, a SHE or FHE encryption is used which allows batching operations to be carried out. A description of such an encryption method can be found in the article by J-S. Coron et al. entitled "Batch fully homomorphic encryption of the integers" published in Advances in Cryptology—EUROCRYPT 2013, Lecture Notes in Computer Science, vol 7881. Springer, Berlin, Heidelberg.

The principle of batch processing is to multiplex several cleartexts to form a composite cleartext in order to obtain a single ciphertext. Thus, instead of encrypting the cleartexts independently of each other, a composite cleartext message is encrypted that is built from the cleartexts in question.

Batch processing allows a same operation to be parallelised over a plurality of ciphertexts in the homomorphic domain. More precisely, if a plurality of first cleartexts are noted $\alpha_1, \ldots, \alpha_L$, a first composite cleartext message built by batching from these first cleartexts is noted $(\alpha_1, \ldots, \alpha_L)$ and if the same plurality of second cleartexts are noted $\beta_1, \ldots, \beta_L$, a second composite cleartext message built by batching from these second cleartexts is noted $(\beta_1, \ldots, \beta_L)$ and if the first and second composite messages in question are encrypted:

$$Enc(\alpha_1, \ldots, \alpha_L; HE.pk) = \overline{\alpha} \qquad (5\text{-}1)$$

$$Enc(\beta_1, \ldots, \beta_L; HE.pk) = \overline{\beta} \qquad (5\text{-}2)$$

then an addition or multiplication operation can be performed in parallel on the ciphertexts in the homomorphic domain by computing $\overline{\alpha} \oplus \overline{\beta}$ and $\overline{\alpha} \square \overline{\beta}$ (the notation $\square$ denotes the internal multiplication law) respectively, given that:

$$Dec(\overline{\alpha} \oplus \overline{\beta}; HE.sk) = (\alpha_1 + \beta_1, \ldots, \alpha_L + \beta_L) \qquad (6\text{-}1)$$

$$Dec(\overline{\alpha} \square \overline{\beta}; HE.sk) = (\alpha_1 \times \beta_1, \ldots, \alpha_L \times \beta_L) \qquad (6\text{-}2)$$

In the same way, an external multiplication on ciphertexts can be performed in parallel by computing $k \otimes \overline{\alpha}$, given that:

$$Dec(k \otimes \overline{\alpha}; HE.sk) = (k\alpha_1, \ldots, k\alpha_L) \qquad (7)$$

Furthermore, some homomorphic encryption methods, such as BGV, make it possible to perform accumulation of the constituent cleartexts of the composite cleartext, as described in the original article by Z. Brakerski et al. entitled "Fully homomorphic encryption without bootstrapping" published in Cryptology ePrint Archive, Report 2011/277. More precisely, a second ciphertext $\overline{\alpha}'$ can be obtained from the ciphertext $\overline{\alpha}$ whose decryption gives:

$$Dec(\overline{\alpha}'; HE.sk) = \left( \sum_{\ell=1}^{L} \alpha_\ell, \ldots, \sum_{\ell=1}^{L} \alpha_\ell \right) \quad (8)$$

In other words, after decryption, a second composite message is obtained whose constituent elements are all equal to the sum of the cleartexts composing the original composite message.

The above-mentioned batch processing properties allow the computation of Euclidean distances in the homomorphic domain in a small number of operations. Indeed, in this case, a single homomorphic ciphertext represents all the components of a reference characteristic vector $y_i^{ref}(y_{i,1}^{ref}, \ldots, y_{i,M}^{ref})$. The third term of expression (4) can then be computed by means of only two homomorphic operations, regardless of the dimension M of the characteristic space. Two additional additions in the homomorphic domain allow the computation in the homomorphic domain of a Euclidean distance to completed. The computation of Euclidean distances is thereby particularly efficient.

Alternatively, batch processing can be carried out component by component on all the reference characteristic vectors. More precisely, each ciphertext represents all the components of the same rank of the different reference characteristic vectors. This batch processing is adapted to the case where the classification function is more complex than that of a search for the nearest neighbour, especially when it is expressed as a polynomial function of the data to be classified.

Figure 2:
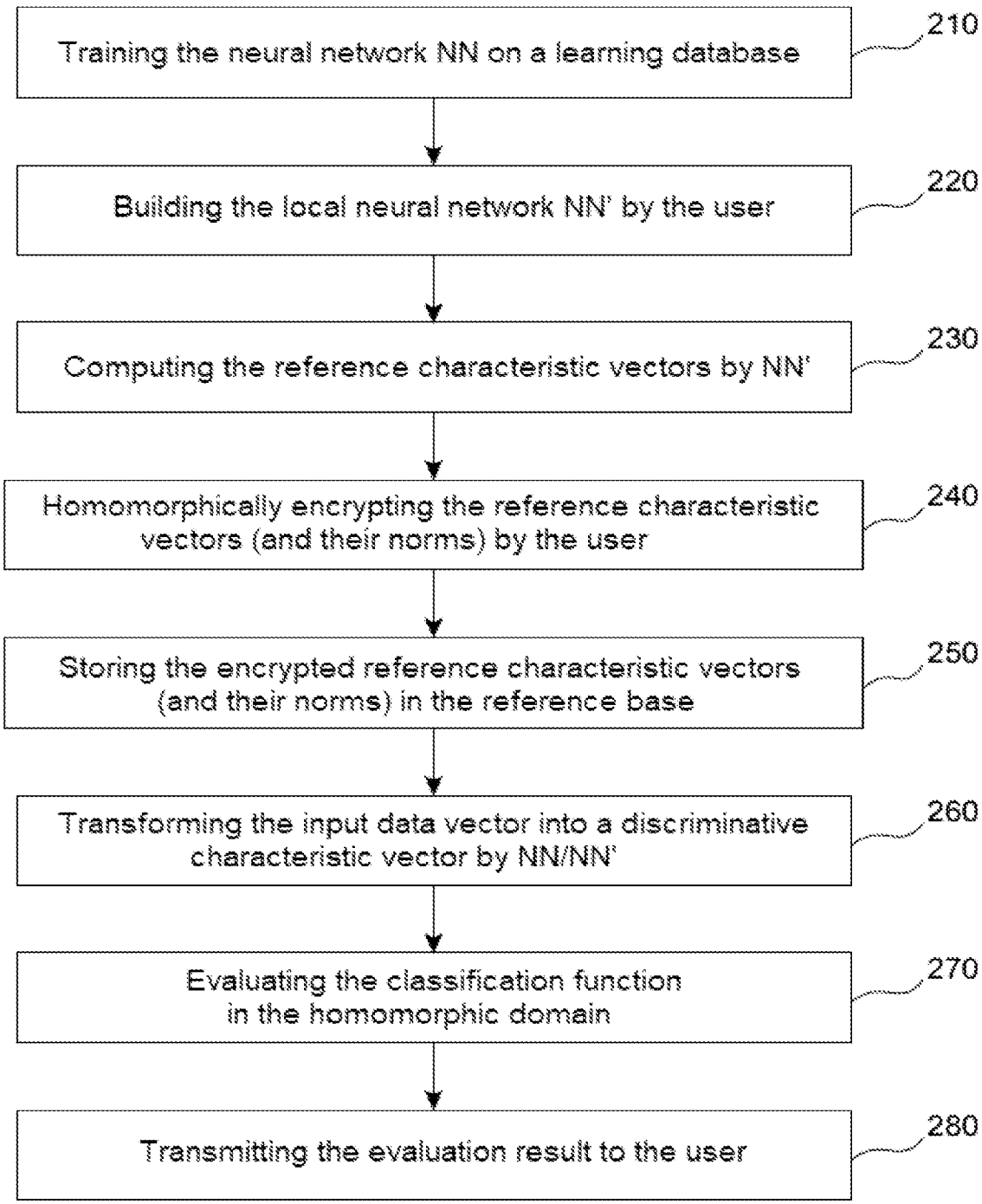
FIG. 2 represents the flowchart of a confidential data classification method according to a first embodiment of the invention.

FIG. 2 represents the flowchart of a confidential data classification method according to one embodiment of the invention.

This method implements an artificial neural network cascaded with a classifier of a classification platform as represented in FIG. 1.

In a first phase, called a learning phase, the artificial neural network, advantageously an auto-encoder, is trained in 210 on a learning database. Thus the auto-encoder can be trained in an unsupervised manner on images stored in this database. At the end of this learning phase, the artificial neural network is able to represent the input data vectors (an image) in a characteristic space of lower dimension (embedding).

The user then downloads the file of synaptic coefficients from the neural network thus trained to build in 220 a local neural network, NN', identical to the one of the platform.

An operational phase follows this learning phase. This includes an initialisation phase of the homomorphic classifier followed by a classification phase.

In the initialisation phase, the user provides the platform with a plurality of reference data vectors (for example a set of images of faces to be recognized), encrypted in the homomorphic domain.

These reference data vectors are transformed in 230 by the local neural network into reference characteristic vectors. In step 240, the reference characteristic vectors are homomorphically encrypted by the user using his/her public key HE.pk. Also, the norms of these reference characteristic vectors are homomorphically encrypted. In step 250, the user transmits the vectors and corresponding norms thus encrypted to the platform to be stored in the reference base. It should be noted that the platform is agnostic because it does not have access to the cleartext reference data (for example, the faces to be recognised).

In the classification phase itself, the user can have the platform classify an input data vector (for example images). This input data vector is first transformed in 260 by the neural network NN of the platform into a discriminative characteristic vector, which is then provided to the classifier. Alternatively, as seen above, the input data vector can be transformed by the user's local neural network and then transmitted by the latter to the platform.

In any case, the classifier evaluates in 270 the classification function F in the homomorphic domain, based on the discriminative characteristic vector and the reference characteristic vectors stored in encrypted form in the reference base. Finally, it transmits the result of the evaluation to the user in 280.

The evaluation result may be the index of the reference characteristic vector (and thus the index of the corresponding reference data vector) with the smallest distance to the discriminative characteristic vector, y. Alternatively, the Euclidean distances homomorphically encrypted, $Enc(\|y - y_i^{ref}\|^2, HE.pk)$, $i=1, \ldots, N$ can be transmitted to the user who decrypts them with his/her secret key HE.pk and can determine, by means of expression (2), the respective probabilities that the input data vector corresponds to the different reference data vectors.

Figure 3:
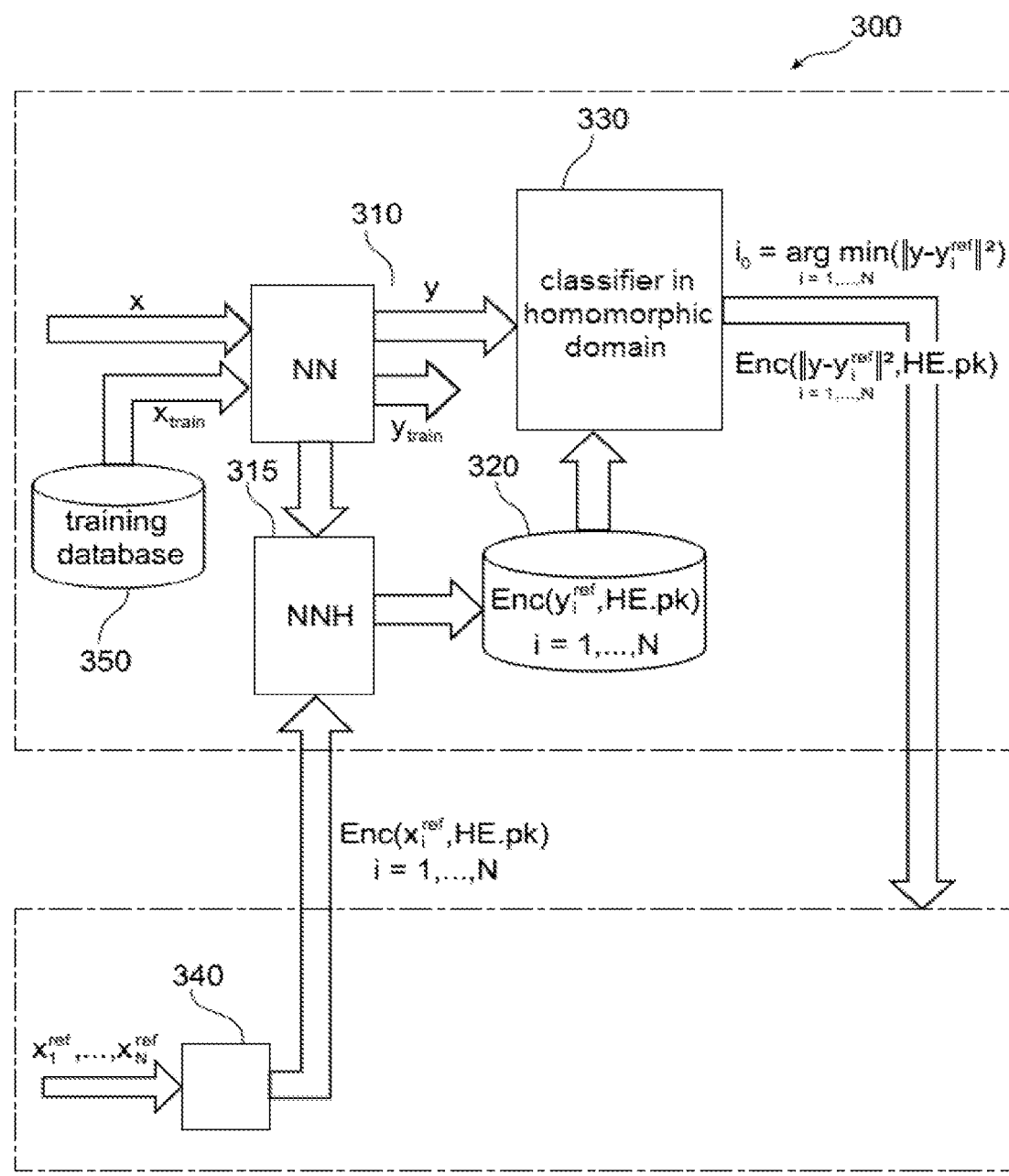
FIG. 3 schematically represents a confidential data classification system according to a second embodiment of the invention.

FIG. 3 schematically represents a confidential data classification system according to a second embodiment of the invention.

As in the first embodiment, the classification platform includes an artificial neural network, 310, cascaded with a classifier 330, adapted to operate in the homomorphic domain.

The artificial neural network is trained on data vectors $x_{train}$ read from the learning database 350. Furthermore, the platform builds the equivalent neural network in the homomorphic domain, 315, hereafter referred to as NNH.

Unlike the first embodiment, the reference data vectors, $x_1^{ref}, \ldots, x_N^{ref}$, are encrypted by the user in the homomorphic domain and transmitted to the platform, 300, to be provided to the neural network NNH. Specifically, the neural network NNH performs equivalent of the compression $f$ in the homomorphic domain, in other words it outputs the homomorphic ciphertext of the reference characteristic vector, $Enc(y_i^{ref}, HE.pk)$ from the homomorphic ciphertext of the reference data vector, $Enc(x_i^{ref}, HE.pk)$. This compression operation in the homomorphic domain is performed once and for all, on the set of reference data vectors $x_1^{ref}, \ldots, x_N^{ref}$. The homomorphic ciphertexts of the reference characteristic vectors, $Enc(y_i^{ref}, HE.pk)$, $i=1, \ldots, N$, are stored in the reference database, 320, the homomorphic ciphertext $Enc(y_i^{ref}, HE.pk)$ being represented by an encrypted component vector $Enc(y_{i,m}^{ref}, HE.pk)$, $m=1, \ldots, M$. The norm of each vector $y_i^{ref}$, $i=1, \ldots, N$ is deduced therefrom in the homomorphic domain, that is $Enc(\|y_i^{ref}\|^2, HE.pk)$, and is stored in the reference base 320 in relation to the vector $Enc(y_i^{ref}, HE.pk)$.

Again, this is a scenario where the user wishes to classify an input data vector x (for example an image from a video stream for facial recognition). This vector is usually provided directly to the platform without passing through the user. In some cases, however, the user could provide the input data vector.

The neural network of the platform performs compression of the input data vector to deduce the discriminative characteristic vector y therefrom, and then provides it to the classifier 330. The function of the classifier 330 is identical to that of the classifier 130. In particular, the classifier 330 computes in the homomorphic domain the respective distances between the discriminative characteristic vector and the different reference vectors. It returns to the user the index of the reference vector corresponding to the smallest distance or the distances to these vectors, encrypted in the homomorphic domain.

Figure 4:
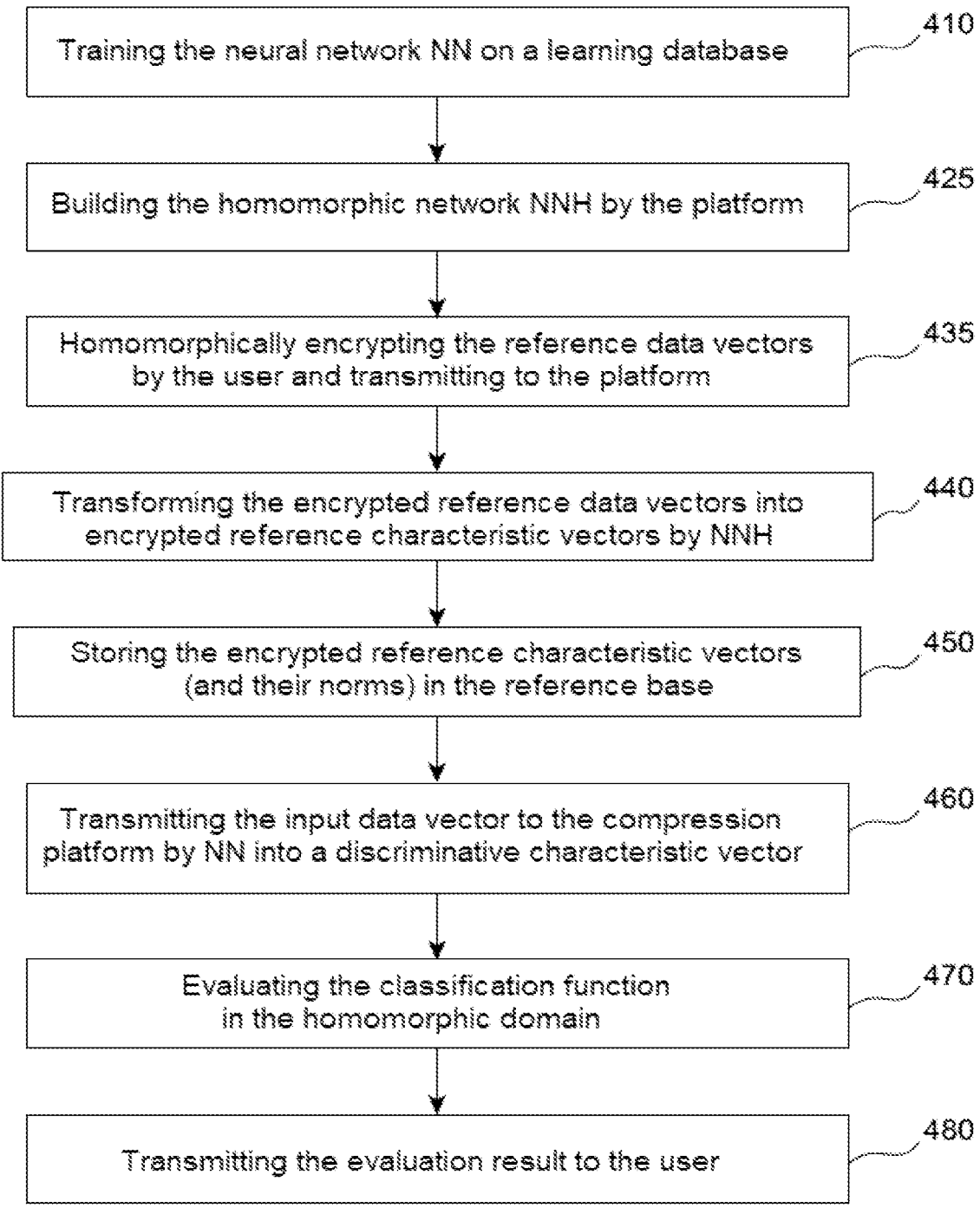
FIG. 4 represents the flowchart of a confidential data classification method according to a second embodiment of the invention.

FIG. 4 represents the flowchart of a confidential data classification method according to a second embodiment of the invention.

Unlike the first embodiment, the learning phase comprises, further to a training step, 410, of the neural network NN (identical to step 210 of FIG. 2), a step 425 in which the platform builds a neural network NNH performing equivalent of the compression $f$ in the homomorphic domain.

This learning phase is followed by an operational phase, comprising an initialisation phase 435-450 and a classification phase 460-480.

In step 435, the user encrypts the reference data vectors $x_1^{ref}, \ldots, x_N^{ref}$ and then transmits them to the platform.

In step 440, the neural network NNH performs compression of the reference data vectors in the homomorphic domain to obtain the reference characteristic vectors, encrypted in the homomorphic domain, $Enc(y_i^{ref}, HE.pk)$, $i=1, \ldots, N$. The norms of these vectors are also computed in the homomorphic domain, $Enc(\|y_i^{ref}\|^2, HE.pk)$, $i=1, \ldots, N$.

In step 450, these vectors (as well as their norms) are stored in the reference base of the platform.

The classification phase comprises steps 460-480 as in the first embodiment. Step 460 may differ from step 260 in that the input data vector X to be classified is still provided to the platform to be transformed by the artificial neural network NN into a discriminative characteristic vector y. In other words, the compression is here performed by the neural network of the platform and never by the local neural network of the user.

On the other hand, the following steps 470 and 480 are respectively identical to the steps 270 and 280 described in connection with FIG. 2.

At the end of the classification phase, the platform transmits to the user the index of the reference characteristic vector with the smallest distance to the discriminative characteristic vector, y, or the Euclidean distances homomorphically encrypted, $Enc(\|y-y_i^{ref}\|^2, HE.pk)$.

The second embodiment differs from the first one in that the artificial neural network is not shared between the platform and the user. It therefore implies that the platform performs compression of the reference data vectors into the homomorphic domain, which, as has been seen in the introductory section, can be highly detrimental to the computational volume. However, it is essential to note that, unlike prior art, the operation of the network in the homomorphic domain takes place here only in the initialisation phase and not at each classification request.

The invention claimed is:

1. A confidential data classification platform comprising:
an artificial neural network cascaded with a classifier, the artificial neural network being configured to be trained during a learning phase on data vectors from a learning database and to transform, in an operational phase, input data vectors into discriminative characteristic vectors, said discriminative characteristic vectors being provided to the classifier and having a size smaller than that of the data vectors; and
a reference base in which are stored, during an initialisation phase of the classifier, reference characteristic vectors, obtained by transforming, using the artificial neural network or a copy thereof, reference data vectors, the reference characteristic vectors being stored in encrypted form by a public key of a homomorphic cryptosystem of a user,
wherein, after the initialisation phase, when the user requests the classification platform to classify an input data vector, the classifier evaluates a classification function in a homomorphic domain, from a discriminative characteristic vector (y) provided by the artificial neural network or the copy thereof, and from the reference characteristic vectors stored in encrypted form in the reference base ($Enc(y_i^{ref}, HE.pk)$, $i=1, \ldots, N$), and transmits a result of the evaluation to the user.

2. The confidential data classification platform according to claim 1, wherein the artificial neural network is an auto-encoder.

3. The confidential data classification platform according to claim 1, wherein the homomorphic system is additive.

4. The confidential data classification platform according to claim 1, wherein the homomorphic system is a somewhat homomorphic encryption (SHE) or a fully homomorphic encryption (FHE) system.

5. The confidential data classification platform according to claim 1, wherein:
the user downloads from the platform a copy of the artificial neural network at an end of the learning phase, and
the copy of the neural network is configured to provide, during the initialisation phase, the reference characteristic vectors from the reference data vectors, the user having a module for homomorphic encryption by the public key configured to encrypt the reference characteristic vectors and transmit them to the platform where they are stored in the reference base.

6. The confidential data classification platform according to claim 1, wherein the platform further comprises a second artificial neural network configured to perform in the homomorphic domain a transformation operation equivalent to that performed by the artificial neural network in a cleartext domain, the user having a module for homomorphic encryption by the public key configured to encrypt the reference data vectors and transmit them to the platform where they are transformed by the second neural network into reference characteristic vectors encrypted in the homomorphic domain before being stored in the reference base.

7. The confidential classification platform according to claim 5, wherein the classifier is configured to compute in the homomorphic domain a scalar product of the discriminative characteristic vector, y, with the reference characteristic vectors from the cleartext components $(y_1, \ldots, y_M)$ of the discriminative characteristic vector, and the encrypted components of the reference characteristic vectors, using $$Enc\left(\sum_{i=1}^{M} y_{i,m}^{ref} y_m; HE.pk\right) = \left(\bigoplus_{m=1,\ldots,M} \left(Enc(y_{i,m}^{ref}, HE.pk) \otimes y_m\right)\right)$$

where $\oplus$ is an internal addition operation in the homomorphic domain and $\otimes$ is an external multiplication operation between an element of the homomorphic domain and a cleartext.

8. The confidential classification platform according to claim 7, wherein said scalar product is computed using batch processing, by clustering different components of each reference characteristic vector within a first composite cleartext message, the first composite cleartext message being subsequently homomorphically encrypted to obtain a first composite encrypted message, and by clustering different components of the discriminative characteristic vector within a second composite cleartext message, the batch processing comprising an external multiplication of the encrypted first composite message with the second composite cleartext message.

9. The confidential data classification platform according to claim 7, wherein the user provides the classifier with the public key HE.pk of his/her homomorphic cryptosystem and the classifier is further configured to compute the ciphertext of a norm of the discriminative characteristic vector, $\text{Enc}(\|y\|^2,\text{HE.pk})$.

10. The confidential data classification platform according to claim 9, wherein the classifier is further configured to compute, in the homomorphic domain, Euclidean distances between the discriminative characteristic vector (y) and the reference characteristic vectors ($y_i^{ref}$, i=1, . . . , N), from an encrypted norm of the discriminative characteristic vector, encrypted norms of the reference characteristic vectors, and respective scalar products between the discriminative characteristic vector and the reference characteristic vectors.

11. The confidential data classification platform according to claim 10, wherein the classifier compares the Euclidean distances in the homomorphic domain and returns to the user an index of the reference characteristic vector corresponding to a smallest Euclidean distance.

12. The confidential data classification platform according to claim 10, wherein the classifier returns to the user the Euclidean distances obtained in the homomorphic domain and the user derives therefrom using a private key of his/her homomorphic cryptosystem, respective probabilities that the input data vector corresponds to the reference data vectors.

13. A method for confidentially classifying data using an artificial neural network and a classifier, wherein the artificial neural network is trained during a learning phase on data vectors of a learning base, and the artificial neural network or a copy thereof transforms, in an operational phase, input data vectors into discriminative characteristic vectors, said discriminative characteristic vectors being provided to the classifier and having a size smaller than that of the data vectors, said method comprising:

during an initialisation phase of the classifier, storing in a reference base reference characteristic vectors obtained by transforming, using the artificial neural network or the copy, reference data vectors, the reference characteristic vectors being stored in encrypted form by a public key of a homomorphic cryptosystem of the user; and after the initialisation phase, when the user requests classification of an input data vector from the classification platform, a classification function is evaluated by the classifier in a homomorphic domain, from a discriminative characteristic vector (y) provided by the artificial neural network and the reference vectors stored in encrypted form in the reference base ($\text{Enc}(y_i^{ref},\text{HE.pk})$, i=1, . . . , N), a result of the evaluation being transmitted to the user.

* * * * *